(12) United States Patent
Craun et al.

(10) Patent No.: US 7,049,357 B2
(45) Date of Patent: May 23, 2006

(54) ODOR FREE POLYLACTIC ACID MODIFIED AQUEOUS EMULSION PAINTS FREE OF VOLATILE COALESCING ORGANIC SOLVENT

(75) Inventors: Gary P. Craun, Berea, OH (US); Jude Thomas Rademacher, Akron, OH (US)

(73) Assignee: The Glidden Company, Strongsville, OH (US)

( * ) Notice: Subject to any disclaimer, the term of this patent is extended or adjusted under 35 U.S.C. 154(b) by 760 days.

(21) Appl. No.: 09/839,049

(22) Filed: Apr. 23, 2001

(65) Prior Publication Data

US 2005/0192388 A1    Sep. 1, 2005

(51) Int. Cl.
    *C08K 5/092*    (2006.01)

(52) U.S. Cl. ........................ 524/284; 524/300

(58) Field of Classification Search ............... 524/284, 524/300
    See application file for complete search history.

(56) References Cited

U.S. PATENT DOCUMENTS

| | | | |
|---|---|---|---|
| 5,326,808 A | * | 7/1994 | Floyd et al. ............ 524/457 |
| 5,346,948 A | | 9/1994 | Floyd et al. |
| 5,422,392 A | | 6/1995 | Floyd et al. |
| 5,470,906 A | | 11/1995 | Craun et al. |
| 5,470,946 A | | 11/1995 | Hefner, Jr. et al. |
| 5,728,761 A | | 3/1998 | Kuyama et al. |
| 5,770,682 A | | 6/1998 | Ohara et al. |
| 5,821,327 A | | 10/1998 | Oota et al. |
| 5,880,254 A | * | 3/1999 | Ohara et al. ............ 528/483 |

* cited by examiner

*Primary Examiner*—David W. Wu
*Assistant Examiner*—William Cheung
(74) *Attorney, Agent, or Firm*—Kenneth J. Stachel

(57) ABSTRACT

An aqueous ambient dry decorative or protective coating comprising a film forming matrix polymer of an aqueous emulsion polymer of aqueous copolymerized ethylenically unsaturated monomers modified with at least 3% by weight of a low molecular weight oligomer of copolymerized hydroxy alkanoic acid having 2 to 4 carbon atoms having a number average molecular weight between 300 and 10,000 to provide a film forming binder substantially free of volatile organic coalescing solvents. Preferred oligomers are homopolymers and copolymers of polymerized lactic acid or polymerized glycolic acid.

31 Claims, No Drawings

ODOR FREE POLYLACTIC ACID MODIFIED AQUEOUS EMULSION PAINTS FREE OF VOLATILE COALESCING ORGANIC SOLVENT

This invention pertains to latex air dry aqueous emulsion paints and more particularly to odor free consumer latex paints substantially free of offensive odoriferous coalescing solvents. The latex paints of this invention contain an essentially non-volatile, low molecular weight poly(hydroxy acid) thermoplastic oligomer, such as poly(lactic acid) oligomer, as a film forming modifier additive to the matrix film forming polymer.

BACKGROUND OF THE INVENTION

Paint coatings are surface protective coatings applied to substrates and dried to form continuous films for decorative purposes as well as to protect the substrate. Consumer paint coatings are air-drying aqueous coatings applied primarily to architectural interior or exterior surfaces, where the coatings are sufficiently fluid to flow out, form a continuous paint film, and dry at ambient temperatures to protect the substrate surface. A paint coating ordinarily comprises an organic polymeric binder, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in a dispersant medium, and thinning to commercial standards.

Latex paints for the consumer market ordinarily are based on polymeric binders prepared by emulsion polymerization of ethylenic monomers. A typical consumer latex paint binder contains a vinyl acetate copolymer consisting of polymerized vinyl acetate (80%) and butyl acrylate (20%), although many paint binders comprise numerous combinations of copolymerized vinyl and/or acrylic ethylenically unsaturated monomers. The hardness of the latex polymer must be balanced to permit drying and film formation at low application temperatures, which requires soft polymer units, while at the same time the polymer must be hard enough in the final dried film to provide film integrity resistance properties, which requires hard polymer units. This conventionally is accomplished by designing a latex polymer with a moderately elevated Tg (glass transition temperature) having a Tg above the ambient dry temperature, but then lowering the Tg temporarily with a volatile coalescing solvent. Coalescing solvents function to externally and temporarily plasticize the latex polymer for time sufficient to develop film formation, but then the coalescing agents diffuse out of the film by the volatilization of the coalescent. If a lower Tg binder copolymer is used without a volatile coalescing solvent, higher levels of soft comonomer are required, but the final dried film of lower Tg polymers would be undesirably soft, excessively tacky, readily stain, and easily pick up dirt.

A significant source of residual odor in latex consumer paints is directly due to the volatile coalescing solvent. Coalescing solvents are typically linear (or slightly branched) glycol ethers and esters of 7 to 12 carbon atoms in length. One typical coalescing solvent ordinarily contained in commercial latex paints is 2,2,4-trimethylpentanediol monoisobutyrate. The odor associated with the gradual volatilization of this solvent is considered objectionable by consumers. Quite often the odor lingers for days after the paint is applied and dried. All useful coalescing solvents are volatile and have similar objectionable characteristics.

Commonly assigned U.S. Pat. Nos. 5,326,808 and 5,422,392 and 5,470,946 teach odor free air dry latex paints where the polymeric binder is modified with a non-volatile oligomeric polyurethane or a polyester having a Tg below −20 degrees C. to produce an air dry paint free of objectionable odors and volatile coalescing solvents. Similarly, commonly assigned U.S. Pat. No. 5,346,948 teaches a low molecular weigh chlorinated hydrocarbon as a non-volatile modifier to avoid the need for volatile coalescing solvents.

In the field of thermoplastic injection molding, U.S. Pat. No. 5,728,761 discloses high molecular weight polylactic acid molding compounds having molecular weights between 50,000 and 300,000 modified with low molecular weight lactic acid derivatives used as placticizers in the molded product. The low molecular weight lactic acid derivatives are linear esters or polyesters produced by esterifying the carboxyl groups of the lactic acid with alkyl or aryl groups along with alkylation of the hydroxyl group with alkyl, aryl, acyl, or silyl groups.

It now has been found that low molecular weight oligomers of poly(hydroxy acid) such as poly(lactic acid) can be used as non-volatile film forming modifiers in latex aqueous emulsion paints to assist room temperature film forming without the use of objectionable volatile coalescing solvents. Particularly useful poly(hydroxy acid) oligomers are alkyl ester terminated and further contain hydrophilic terminal hydroxyl groups to facilitate direct mixing of the oligomer into the aqueous emulsion latex paints. By using non-volatile, external softening oligomers in accordance with this invention, the relationship between Tg (or MFT) and film forming temperature of the polymeric binder in the final paint can be changed such that both film formation and tack-free character are simultaneously obtained without the need for a volatile coalescing solvent.

Preferred poly(hydroxy acid) oligomers are poly(lactic acid) hereafter "PLA" and poly(glycolic acid) hereafter "GLA". Lactic acid is a naturally occurring organic hydroxy acid comprising an alpha hydroxy propionic acid containing both carboxyl and hydroxy groups, which copolymerize by self esterification to form linear polylactic acid. Glycolic acid likewise is a naturally occurring organic hydroxy acid comprising hydroxyacetic acid. Due to combined hydrophobic and hydrophilic characteristics, the PLA and GLA oligomers are compatible with typical aqueous emulsion vinyl acetate polymers copolymers and acrylic polymers copolymers commonly used as binders in latex paints. The PLA and GLA oligomers of this invention can be retained permanently and will not volatilize out of the final paint film. Hence, applied paint films will not generate an odor while drying nor emit a residual odor from the dried paint film or otherwise emit VOC's. The softening oligomeric modifiers of this invention externally modify the vinyl or acrylic binder matrix polymers and do not coreact with the matrix polymer. The oligomers are particularly useful as non-volatile coalescing aids in latex paints. The softening oligomeric modifiers of this invention appear to soften the binder polymers in aqueous liquid form but remain in the film and reinforce the matrix polymeric binder during drying to provide low temperature film formation and tack-free films not prone to soiling at a given hardness and/or flexibility.

A problem with polyester or polyurethane oligomers used to modify latex paints, such as shown in U.S. Pat. No. 5,326,808, is that conventional polyester oligomers comprising glycols esterified with dicarboxylic acids can not be directly mixed with aqueous emulsion latexes. Such polyester oligomers need to be dissolved in the monomer, emulsified, and then the monomers copolymerized in situ with the conventional polyester oligomer, or alternatively, the oligomer must be pre-emulsified in water before mixing with latex polymer. In contrast, the oligomers of this invention can be separately preformed and added directly to the latex or resulting paint as an aqueous emulsion. Another deficiency with conventional glycol polyester in modified latex paints is that dried paint films have fair scrub resistance at best. In contrast, the oligomer modified paints of this invention provide dry paint films exhibiting excellent scrub resistance. Another deficiency is that conventional glycol dicarboxylic acid polyesters tend to hydrolyze and can generate toxic materials.

Accordingly, a major advantage of this invention pertains to dried paint films exhibiting superior toughness obtained through the use of a film forming matrix polymer balanced with the poly(hydroxy acid) oligomeric modifier to obtain liquid phase softening through the addition of softening modifier while retaining the desired dried film hardness. Volatile coalescing agents can be eliminated and binder volume can be increased by using a permanently retained non-volatile softening oligomer instead of a volatile coalescent. The resulting dried paint films exhibit a superior balance of hardness and flexibility while maintaining long term flexibility. As an added benefit, the oligomers are derived from renewable sources such as corn syrup, beet sugar, or agricultural waste by fermentation, and are based on bio-renewable materials very safe for human contact. These and other advantages of this invention will become more apparent by referring to the detailed description and illustrative examples.

SUMMARY OF THE INVENTION

Briefly, the air dry aqueous emulsion latex paint of this invention contains a polymeric matrix film forming polymer of aqueous polymerized ethylenically unsaturated monomers externally modified with a non-reactive, low molecular weight, compatible, non-volatile poly(hydroxy acid) oligomer having terminating alkyl ester groups. The preferred oligomers are poly(lactic acid) and poly(glycolic acid) and have a low number average molecular weight broadly from 300 to 10,000 number average molecular weight. The oligomers are used at levels as low as 3% and preferably from 5% to 20%, based on the weight of the mixture of film forming matrix polymer and low molecular weight oligomer. In accordance with a preferred aspects of this invention, low molecular weight poly(hydroxy acid) oligomer is prepared from much higher molecular weight poly(hydroxy acid) polymer, where alcohol degradative transesterification of the high molecular weight polymer is used to cleave ester linkages between poly(hydroxy acid) polymer links to transesterify cleaved chains and produce the low molecular weight oligomer having pendant alkyl ester groups.

DETAILED DESCRIPTION OF THE INVENTION

The air dry emulsion latex paint of this invention comprises a film forming matrix polymer of aqueous emulsion copolymerized ethylenically unsaturated monomers, where the polymeric matrix polymer is modified with a non-volatile poly(hydroxy acid) thermoplastic oligomer to provide ambient temperature film forming properties to the matrix addition polymer.

Referring to the low molecular weight poly(hydroxy acid) oligomer, also described as a poly(alkanoic acid) oligomer, the low molecular weight thermoplastic oligomer comprises copolymerized homopolymers or copolymers of aliphatic hydroxy carboxylic acid having from 2 to 4 carbon atoms. The hydroxy acids have carboxylic acid groups as well as hydroxyl groups which inter-copolymerize to form an ester linked linear polymer of copolymerized monomeric units of hydroxyl acid. Useful hydroxy carboxylic acids include lactic acid, glycolic acid, hydroacrylic acid and hydroxybutyric acid. Useful polymers of such hydroxy acids include poly(lactic acid), poly(glycolic acid), poly hydracrylic acid, and poly(hydroxybutyric acid), as well as copolymers of mixed hydroxy acids. Preferred poly(hydroxy acid) oligomers are homopolymers of a polymerized hydroxy acid, while copolymers of mixed hydroxy acids are similarly useful. The most preferred oligomers are poly(lactic acid) and poly(glycolic acid). The description hereafter is in respect to the preferred polymers of lactic acid and poly(lactic acid), which illustrate the usefulness of hydroxy acids and their homopolymers and copolymers for use as low molecular weight oligomeric modifiers in accordance with this invention.

Referring to the low molecular weight poly(lactic acid) oligomer, the PLA oligomer is essentially non-volatile at ambient or room temperatures and comprises copolymerized monomeric units of lactic acid. Lactic acid is alpha hydroxy propionic acid containing both a carboxyl and a hydroxyl group, which undergo self esterification to form linear homopolyesters of lactic acid. The simplest homopolymerized product is a linear dimer of two lactic acid units known as lactoyllactic acid. Higher molecular weight linear polymerized lactic acid produces multiple lactic acid units homopolymerized to form poly(lactic acid). Several patents teach the synthesis of high molecular weight homopolymerized PLA, such as, U.S. Pat. Nos. 5,728,761; 5,880,254; and 5,821,327. The synthesis of low molecular weight PLA oligomers around 2000 to 6000 is disclosed in U.S. Pat. No. 5,770,682 by reference to JP-B-5-13963 pertaining to a production of PLA by ring opening polymerization of lactide where the polymerization rate is reduced by addition of phosphoric acid to inactivate the catalyst for promoting homopolymerization of lactic acid.

In accordance with this invention, low molecular weight PLA oligomer is preferably produced by degradative transesterification by an alkyl alcohol of high molecular weight PLA polymer to produce,a low molecular weight PLA oligomer transesterified with the alkyl alcohol. High molecular weight PLA polymer typically comprises multiple copolymerized lactic acid units interconnected with ester linkages in a linear polymeric chain terminated at one end with a carboxylic acid group and terminated at the other end with a hydroxyl group. Reaction with an alkyl alcohol cleaves ester linkages between polymerized lactic acid units of the high molecular weight polymer to transesterify cleaved ester groups and produce low molecular weight PLA oligomer containing terminal alkyl ester groups derived from the transesterifying alkyl alcohol. A less preferred method of producing the low molecular weight PLA is copolymerization of multiple lactic acid monomeric units in the presence of mono alkyl alcohol to produce essentially a homopolymer of low molecular weight poly(lactic acid) oligomer. Copolymerization of lactic acid to directly form PLA oligomer comprises linear ester polymerization of lactic acid units in the presence of an alkyl alcohol to form an oligomeric molecule with a terminal alkyl ester group and a terminal hydroxyl group. By either method, the resulting PLA contains terminal alkyl ester groups derived from alkyl alcohol, where the PLA oligomer has a number average molecular weight broadly between 300 and 20,000, and preferably between 300 and 10,000. An alternative less preferred method for producing the PLA oligomer is ring opening polymerization of lactide by reacting the lactide with alkyl alcohol to produce a linear alkyl ester terminated PLA oligomer. Regardless of the method, a useful number of homopolymerized lactic acid monomeric units per oligomer are polymerized, typically from 3 to 15, preferably 3 to 8, although higher analogs can be used. The Tg of the PLA oligomer is typically below 0° C. and preferably less than −20° C.

The present invention utilizes low molecular weight PLA oligomers terminated with alkyl ester groups and preferably having a low and narrow distribution range average molecular-weight where the polydispersed index typically is below 1.8 and preferably less than 1.5. The PLA oligomers are non-volatile modifier additives to emulsion matrix addition polymers used as film forming binders in paint films, where the PLA oligomers are non-volatile at ambient drying temperatures of the paint films. Useful molecular weights of PLA oligomer are between 300 and 10,000 and used in combination with a latex matrix addition polymer. Molecular weights are number average molecular weights (Mn) as determined by GPC with polystyrene as a standard. PLA oligomers having molecular weights below about 300 tend to be volatile and subject to excessive oligomeric migration, while molecular weight PLA oligomers between 10,000 and 20,000, although less preferred, can nevertheless be useful with softer or lower Tg matrix copolymers. On a weight basis, at least 3% and preferably between 5% and 20% PLA oligomer is added based on the weight of film forming polymeric matrix polymer.

In accordance with this invention, non-volatile oligomers of poly(lactic acid) having terminal alkyl ester groups can be used as a softening agent to avoid use of conventional volatile organic coalescing solvents in latex paints. Useful and preferred PLA oligomers can be produced by alcoholic degradation esterification of high molecular weight PLA assisted by a wide variety of catalysts. Low molecular weight PLA can be prepared by degradation of high molecular weight PLA with moderate alkyl chain aliphatic mono-alcohols having 3 to 20 carbon atoms, and preferably from 8 to 12 carbon atoms. The alkyl alcohols degrade the high molecular weight PLA by cleaving ester linkages between copolymerized lactic acid units, whereupon the alkyl alcohol transesterifies with resulting low molecular weight PLA and link with carboxyl radicals on the degraded high molecular weight PLA. The resulting low molecular weight oligomer PLA containing transesterified alkyl ester groups has an alkyl alcohol ester group at one end of most every cleaved PLA chain, which provides hydrophobicity to the PLA oligomer. The terminal hydrophobic alkyl ester group tends to maintain the PLA oligomer inside the latex particles and avoids hydrolysis with water. Preferred alkyl chains contain 8 to 12 carbon atoms since lower chain alkyl less than 8 carbon atoms tend to hydrolyze to some extent as the alkyl chains become smaller. Although alkyl groups with 3 to 6 carbon atoms are not preferred, these alcohols can be useful by adjusting the molecular weight of the matrix polymer. The alkyl alcohol ester group provides hydrophobicity to the PLA oligomer and tend to maintain the PLA oligomer inside the latex particles and away from the surrounding water.

The number of lactic acid units per oligomer is desirably from 3 to 15 copolymerized lactic acid monomeric units. The starting high molecular weight PLA material has a molecular weight above 21,000, preferably above 30,000, and can be as high as 100,000 or more, but preferably between 50,000 and 100,000. The degraded PLA oligomer has a useful molecular weight between 300 and 10,000, and preferably between 300 and 2,000 and most preferably between 500 and 1,000. Degradation of higher molecular weight PLA is the preferred procedure to produce a narrow low molecular range distribution oligomer. Mono alkyl alcohol transesterified with PLA carboxyl groups minimizes hydrolysis with water and provides substantial stability to the polymeric mixture of matrix polymer and PLA oligomer.

High molecular weight PLA having a molecular weight typically 50,000 to 100,000 or higher is a preferred starting material for forming oligomic PLA in accordance with this invention. High molecular weight PLA can be produced by several processes, such as disclosed in U.S. Pat. No. 5,728,761, incorporated herein by reference, which is directed to producing high molecular weight PLA for use as molding compositions for thermoplastic products. The first method disclosed in the patent describes poly(lactic acid) made by a lactide ring opening polymerization process where a cyclic dimer (lactide) is subjected to ring opening polymerization. The second method disclosed in the patent describes a direct dehydration polymerization process where lactic acid monomer units are directly subjected to dehydration condensation to copolymerize and produce poly(lactic acid). The disclosed processes can produce high molecular weight PLA's having molecular weights between about 50,000 and 500,000.

The preferred process for producing PLA oligomers in accordance with this invention is to begin with high molecular weight PLA and degrade transesterify the PLA with an alkyl mono-alcohol in the presence of a catalyst. Degradation catalysts can be any catalyst for transesterification, such as butyl stannoic acid, titanium (IV) isopropoxide or lithium neodecanoate. Reaction temperatures can be from 150–220° C. although elevated temperatures can cause some discoloration of the material. Reaction times vary depending on the catalyst used and the desired overall properties of the oligomer. Suitable catalysts include tin catalysts such as butyl stannoic acid or dibutyl tin dilaurate, titanium catalysts such as titanium tetraisopropoxide, lithium catalysts such as lithium neodecanoate, and other esterification and transesterification catalysts. Typically about 0.05% to 0.5% transesterification catalyst is used based on the weight of reactants.

A variety of alkyl aliphatic mono-alcohols can be utilized for the degradation transesterification of high molecular weight PLA ranging from $C_3$–$C_{20}$ alkyl alcohols. Hydrophobic mono alcohols provide much better hydrolytic stability to the PLA oligomeric material in latexes than polyols. Mixtures of alkyl mono-alcohols can be useful if desired. Suitable alkyl mono-alcohols include 2-ethylhexanol, decanol, and all alcohols from methanol up to hexadecanol or higher. Alkyl mono-alcohols, linear or branched, alone or in mixtures, with from 8 to 12 carbons are preferred. On a molar basis, one alkyl mono-alcohol is added for each 2 to 9 polymerized lactic acid units in PLA, depending on the degree of degradation and the molecular weight of the PLA oligomer desired. Ordinarily the typical low molecular weight PLA oligomeric structure comprises a poly(lactic acid) oligomeric molecule terminated at one end with an alkyl ester in accordance with this invention, and terminated at the other end of the molecule with a hydroxyl group.

Although not preferred, the hydroxyl can be esterified or etherified with short alkyl chain reactant, or otherwise reacted, but no advantages are apparent.

In a less preferred method of producing oligomeric PLA, lactic acid monomeric units can be copolymerized directly with an alkyl alcohol to produce PLA oligomers with terminal alkyl ester groups. In this process, homopolymer PLA oligomer is preferred, although lesser amounts of other hydroxy acids, such as glycolic acid can be reacted with lactic acid to provide a poly (lactic acid) copolymer. Typically lactic acid can be reacted with these hydroxy acids to make PLA oligomers comprising less than 50%, preferably less than 10%, by weight of other low molecular weight hydroxyalkanoic acid having two to four carbon atoms, such as glycolic acid (hydroacetic. acid), hydracrylic acid (beta hydroxy propionic acid), and the hydroxybutyric acids. In all methods, terminal alkyl ester groups are connected to terminal carboxylic radicals on the oligomeric PLA chains. The process of this aspect of the invention comprises reacting lactic acid and other hydroxyalkanoic acid, if any, with alkyl aliphatic mono alcohol in the presence of tin catalysts and at temperatures between about 150° and 220° C. to form a low molecular weight homopolymer or copolymer of poly(lactic acid) oligomer.

In an alternative less preferred process, copolymerized cyclic lactide can be heated with alkyl aliphatic mono alcohol to produce low molecular weight oligomeric PLA containing terminal alkyl ester groups. The alkyl alcohol cleaves the cyclic ester groups in the process to produce terminal alkyl ester groups under processing conditions previously described.

In another aspect of this invention, other hydroxy alkanoic acids, also described as hydroxy carboxylic acids, can be homopolymerized, or mixtures of hydroxy acids can be copolymerized, to form high molecular weight linear poly(hydroxy acid) polymer or copolymer, which can be cleaved by degradation transesterification with alkyl alcohol to form low molecular weight poly(hydroxy acid) oligomer in the same manner as PLA oligomer is formed. In this regard, glycolic acid can be polymerized to form high molecular weight poly(glycolic acid), polymers and copolymers, in much the same manner as high molecular weight PLA polymers are formed. Preformed high molecular weight GLA polymers are cleaved by degradation transesterification with an alkyl alcohol to form low molecular weight poly(glycolic acid) oligomer in accordance with this invention. Alternatively, a hydroxy acid can be homopolymerized, or copolymerized with other lesser amounts of another hydroxy alkanoic acid, and reacted with alkyl aliphatic mono alcohol, to directly form a low molecular weight GLA oligomer by heating hydroxy acids and alkyl alcohol at temperatures of about 150° C. and 220° C., in the same manner as preparation of PLA oligomers. By either process, the resulting polymeric oligomer comprises from 3 to 15, preferably from 2 to 8, polymerized units of polymerized hydroxy acid having ester linkages between the copolymerized hydroxy acid units, along with terminal alkyl ester groups of alkyl alcohol and terminal hydroxyl groups. Oligomeric copolymers can contain up to 50% by weight, but preferably less than 10%, of a copolymerized second hydroxy alkanoic acid. Preferred alkyl aliphatic alcohols are $C_8$ to $C_{12}$, in the same manner in producing PLA oligomers. Oligomeric molecular weights can range from 300 to 10,000, preferably from 300 to 2,000, and most preferably 500 to 2,000, in the same manner as PLA oligomer. On a weight basis, at least 3% and preferably from 5% to 20% of oligomer is combined with matrix film forming polymer, based on the total weight solids of the oligomer and the matrix polymer.

Referring now to the matrix copolymer, the matrix film forming polymeric binder comprises an aqueous emulsion copolymerized ethylenically unsaturated monomers to produce a binder copolymer. Useful ethylenically unsaturated monomers include vinyl and acrylic monomers or combinations thereof. Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl propionate, vinyl laurate, vinyl decanoate, vinyl butyrates, vinyl benzoates, vinyl isopropyl acetates and similar vinyl esters; vinyl aliphatic hydrocarbon monomers include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene; and vinyl ether. The vinyl acetate monomer is a conventional monomer copolymerized with selected amounts of other ethylenic monomers to produce a copolymer with other ethylenic monomer. Vinyl monomers can be copolymerized alone, or with acrylic monomer, or with other ethylenically unsaturated monomers. Acrylic monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacryate, cyclohexyl acrylate and methacrylate, decyl acrylate and methacrylate, isodecyl acrylate and methacrylate benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxpropyl acrylates and methacrylates, amino acrylates, methacrylates as well as acrylic acids such as acrylic and methacrylic acid, ethacrylic acid, alpha-chloroacrylic acid, crotonic acid, beta-acryloxy propionic acid, and beta-styryl acrylic acid. Particularly preferred comonomers include acrylates such as methyl, ethyl, propyl, butyl (linear and branched), 2-ethylhexyl; methacrylates such as methyl, ethyl, propyl, butyl (linear and branched), 2-ethylhexyl; vinyl esters such as acetate, propionate, butyrate, pentanoate (neo 5), nonanoate (neo 9), 2-ethylhexanoate, decanoate (neo 10); and other ethylenic monomers such as ethylene, vinyl chloride, vinylidene chloride and butadiene. Acrylic monomers can be copolymerized with or without vinyl monomers, as desired, or with other ethylenically unsaturated monomers. Other useful ethylenically unsaturated monomers include vinyl aromatic hydrocarbon monomers such as styrene, methyl styrene and similar lower alkyl styrenes, as well as vinyl toluene, and vinyl aliphatic hydrocarbons such as alpha olefins. Number average molecular weights of acrylic or vinyl copolymer matrix polymer are typically between about 100,000 and 1,000,000 or more.

Vinyl and/or acrylic monomers, and other monomers if desired, are emulsion copolymerized in water to produce the high molecular weight vinyl or acrylic copolymer matrix polymeric binder. The matrix polymer can be produced by vinyl and/or acrylic monomer being polymerized in an aqueous polymerization medium by adding other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate. Redox systems consist of oxidants and reductants, which can be mixed in any pair. Transition metals such as iron can be used as accelerators for initiators for redox couples. The polymerization initiators are usually added in amounts between about 0.1 to 2 weight percent.

Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols. Preferred anionic surfactants include for example, alkylbenzene sulfonate salts such as sodium dodecylbenzene sulfonate and salts of hexyl, octyl, and higher alkyl diesters of 2-sulfosuccinic acid. Suitable non-ionic surfactants include polyoxyethylene glycols reacted with lyophilic compound, ethylene oxide condensation products reacted with t-octylphenol or nonylphenol and known as "Triton" surfactants, polymerized oxyethylene (IgepalCA), ethylene oxide reacted with organic acids (Emulfor), or organic acid reacted with polyoxyamylene either of stearic or oleic acid esters (Tweens). Suitable surfactants include the various sulfosuccinates such as hexyl, octyl, and hexadecyl sulfosuccinate, the various alkyl and alkyl-aromatic sulfates and sulfonates.

The suspension can be heated to polymerize the vinyl and/or acrylic monomer while initiator is added. Suitable initiators include the common persulfates, peroxides, and hydroperoxides, along with redox initiator systems if desired. Additional monomer can be added at any time during the polymerization to increase the particle size and raise the total solids of the system and help control the polymerization exotherm. The resulting latex suspensions containing softening oligomer can be used as interior or exterior air-dry paints.

Although this invention enables essentially a zero VOC air dry paint coating, and the intent of the invention is to avoid use of volatile organic solvents, use of minor amounts of conventional organic coalescing solvents may be used along with the poly(hydroxy carboxylic acid) oligomer of this invention, if desired. Similarly, low volatility wet edge organic solvents, for instance, useful to increase open drying time for latex paints, including glycols such as propylene glycol, likewise can be added if desired.

A paint coating composition can be produced by combining the externally modified emulsion polymer of this invention with pigments and other paint additives in a dispersing mill such as a Cowles disperser. A pigment dispersion can be preformed consisting of a dispersant and pigments on a disperser mill, a sand mill, a pebble mill, a roller mill, a ball mill or similar conventional grinding mill for milling the mineral pigments into the dispersion medium. The premix can then be combined under low shear with the polymeric binder of this invention and other paint additives as desired. Useful mineral pigments ordinarily include opacifying pigments such as titanium dioxide, zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower, barium sulfate, calcium carbonate and the like can be added.

The merits of this invention are further supported by the following illustrative examples.

EXAMPLE: 1

Synthesis of poly(lactic acid) Oligomer

Heat a mixture of 600 grams of commercial high molecular weight PLA (Nature Works PLA from Cargill Dow), 362 g 2-ethylhexanol and 0.4 g butylstannoic acid at 180° C. under a nitrogen atmosphere to melt the PLA. Initially the PLA forms a highly viscous material which thins out as it melts. After the commercial PLA melted, the reaction was held at 180° C. for 4 hours and then cooled to give an oily resin. Alternatively, the commercial PLA can be added in portions to the hot alcohol allowing for complete melting of the PLA between additions. The resulting low molecular weight PLA oligomer had a Mn=484; Mw=586; PDI=1.21, all determined by GPC; and an Acid No.=1.3.

Hydrolysis Test

Twenty four grams of the PLA oligomer was added to 200 g of commercial vinyl acetate latex (20% loading on total solids) and the pH was adjusted to 8.5 with dilute ammonia. The mixture was stirred overnight to ensure complete incorporation of the oligomer into the latex particles. A test sample was placed in an oven at 60° C. After 28 days in an oven at 60° C., titration of the sample indicates only a 1–3% hydrolysis of the PLA oligomer.

EXAMPLE 2

Synthesis of PLA Oligomer

A mixture of 600 g commercial high molecular weight PLA, 241 g 2-ethylhexanol and 1.0 g titanium (IV) isopropoxide was stirred and heated to 160° C. under nitrogen to melt the PLA. After the PLA melted, the reaction was held at 200° C. for 6 hours and then cooled. The resulting material was a low molecular weight PLA oligomer with properties Mn=609; Mw=830; PDI=1.36, all determined by GPC; and an Acid No.=2.1.

EXAMPLE 3

Synthesis of PLA Oligomer

A mixture of 400 g commercial high molecular weight PLA, 258.6 g 1-dodecanol and 1.0 g titanium (IV) isopropoxide was stirred and heated to 120° C. under nitrogen to melt the PLA. After the PLA melted, the reaction was held at 200° C. for 6 hours and then cooled. The resulting PLA oligomer had physical properties Mn=705; Mw=865; PDI=1.23; and Acid No.=1.4.

EXAMPLE 4

Alternate Synthesis of PLA Oligomer Directly from Lactic Acid

A mixture of 300 g 2-ethylhexanol, 975 g of 88% lactic acid and 0.5 g stannous octoate was placed in a flask equipped with a fractionating distillation column and stirred under a slow nitrogen flow. The reaction was warmed to 200° C. and at 130° C. began to collect over a distillate. The reaction reached temperature after 1 h and held at 200° C. for 6 hours and then cooled to give an oil. The distillate contained 250 g water and 60 g 2-ethylhexanol. The resulting PLA oligomer had a Mn=484; Mw=688; and PDI=1.4, all determined by GPC.

EXAMPLE 5
Alternate PLA Synthesis from Cyclic Lactide

A mixture of 50 g lactide (Aldrich), 20.1 g 2-ethylhexanol and 1 drop stannous octoate was heated at 150° C. for 4 hours and then cooled to give an oil. The resulting PLA oligomer had a Mn=659; Mw=883; and a PDI=1.33, all determined by GPC.

EXAMPLE: 6
Polyester Oligomer Synthesis for Comparative Purposes

Mix 1629.9 g adipic acid with 1870.1 g dipropylene glycol and 1.1 g butyl stannoic acid. Heat to 235° C. under nitrogen, using a packed column to distil off water. Cook to acid number 3–5 mg KOH/g resin. Mix 625 g of this polyester with 36 g Triton X 405 surfactant (Union Carbide), and 339 g water. Heat to 60° C., and emulsify in water using a Sonic Triplex Model T02-2A-HP ultrasonic emulsifier at 1000 psi to give an emulsion of about 0.7 micron average particle size.

EXAMPLE: 7

For use in paint examples, each oligomeric modifier was combined with vinyl acrylic latex at a 10:90 solids ratio at room temperature and stir over night. The oligomer directly replaced vinyl acrylic latex in paint formulas and coalescing solvent was omitted for PLA modified latex paints of this invention.

Flat Paint Formula

| | | |
|---|---|---|
| a) | 25.449 | water |
| | .437 | thickener |
| | 0.88 | mildewcide |
| | .087 | defoamer |
| | 1.05 | surfactant |
| | 31.482 | extender pigment |
| | 7.871 | titanium dioxide |
| | .350 | colloidal silicate |
| b) | 12.461 | water |
| | 2.317 | thickener |
| | .044 | ammonium hydroxide |
| | 1.749 | coalescent |
| | .35 | defoamer |
| | 16.179 | vinyl acrylic latex, 56% solids |

Semi Gloss Paint Formula

| | | |
|---|---|---|
| a.) | 8.69 | water |
| | .048 | thickener |
| | .072 | mildewcide |
| | .193 | defoamer |
| | 1.255 | surfactant |
| | .097 | collodial silicate |
| | 4.345 | extender |
| | 1.448 | coalescent |
| b.) | 1.931 | ethylene glycol |
| | 9.523 | water |
| | 3.017 | thickener |
| | .241 | ammonium hydroxide |
| | 22.208 | titanium dioxide |
| | .58 | defoamer |
| | 4.345 | adhesion promoting latex |
| | 40.072 | vinyl acrylic latex, 56% solids |

Procedure: In the above paints, part (a) is the grind. Parts (a) and (b) were dispersed in a Cowles mixer according to commonly accepted paint making methods. Ingredients in (b) were added in order as given. For the volatile coalescent control, Texanol ester alcohol was used. For PLA oligomer examples, Texanol was replaced with PLA oligomer. PLA oligomer modifiers from Examples 2, 3, and 6 were used to make flat and semi-gloss paints formulated above. The paints tested all had equivalent viscosities and gloss/sheen, while scrub resistances for the paints were as follows.

Results

TABLE 1

| PAINT FORMULA | FILM FORMING AID | SCRUBS* |
|---|---|---|
| Flat | Texanol coalescing solvent (control) | 100% |
| Flat | PLA oligomer (example 2) | 101% |
| Flat | PLA oligomer (example 3) | 78% |
| Flat | polyester/latex blend (example 6) | 53% |
| Semi gloss | Texanol coalescing solvent (control) | 100% |
| Semi gloss | PLA oligomer (example 2) | 116% |
| Semi gloss | PLA oligomer (example 3) | 110% |
| Semi gloss | polyester/latex blend (example 6) | 74% |

*ASTM scrub test with Texanol coalescing solvent paint was run side-by-side as control for each experimental paint. Scrubs are expressed as % of control. Flat paints all had viscosities of 90–110 ku, gloss of 2.5–2.8%, sheen of 7–9%, contrast ratios of 97.3–98.7%. Semi gloss paints all had 95–105 ku viscosities, gloss of 51–61%, sheens of 87 to 92% and contrast ratios of 97–98.7%. Comparative Example 6 utilizing as glycol/diacid polyester produced considerable inferior scrub resistance.

EXAMPLE: 8

Synthesis of Poly(glycolic acid)-2-ethylhexyl ester oligomer.

A mixture of 200 g of a 70% glycolic acid (in water), 53.3 g 2-ethylhexanol and 0.5 g butyl stannoic acid were combined in a reaction flask equipped with a packed distillation column and a mild nitrogen flow. The materials were then heated to 150° C. and a distillate collected at 120° C. with a head temperature of 98° C. After 2 h the upper layer of the distillate (2-ethylhexanol) was added back to the mixture and the reactants raised the temperature to 190° C. After an additional 3 h, a total of 90 mL water was collected. The material was then cooled and collected as a faint yellow resin, which partially solidified upon standing. Oligomer properties were Mn=420, Mw=479 and PDI=1.14, all measured by GPC. The poly(glycolic acid) oligomer was added to commercial vinyl acetate latex at levels of 5–10% on solids and stirred overnight. Films were prepared on a MFFT bar and the crack points were determined along with latexes from prior examples.

| FILM FORMING MODIFIER | CRACK POINT |
|---|---|
| None | 10° C. |
| Texanol coalescing solvent | −1° C. |
| From Example 3 | 1° C. |
| From Example 8 | 0° C. |

Crack points determined by MFFT are used to establish the characteristics of film formation. For commercial latexes without added coalescent the crack point is 10° C. Addition of a modifier as described above provides films with significantly lower crack points of 0±1° C., indicating improved film formation.

EXAMPLE 9
Synthesis of PLA Oligomer with Mn Approximately 5300

A mixture of 500 grams commercial high molecular weight poly(lactic acid), 11.64 grams of 1-dodecanol, and 1.0 grams titanium (IV) isopropoxide was stirred while heating to 160° C. under nitrogen to melt the PLA. After the PLA melted, the temperature was raised to 200° C. and held for 6 hours. The reaction mixture was then cooled and the resulting resin was a dark orange solid of low molecular weight transesterified PLA with the following physical properties: Mn=5300; Mw=13,600;. and PDI=2.57. The oligomer was useful with a latex binder compounded with paint ingredients to form a latex paint.

EXAMPLE 10
Synthesis of Low Molecular Weight PLA Oligomer Having Terminal Hydroxyls Capped with Acetic Acid A mixture of 300 grams of commercial high molecular weight poly(lactic acid), 181 grams of 2-ethylhexanol, and 0.5 grams of butyl stannoic acid was stirred and heated to 160° C. under nitrogen to melt the PLA. After the PLA melted, the reaction mixture temperature was raised to 200° C. and held for 4 hours. The reaction mixture was cooled to 100° C., and then 142 grams of acetic anhydride was added and the reaction temperature was held for 1 hour. The reaction vessel was then equipped with a distallation column and warmed to 170° C. to collect excess acetic distillate. After 1 hour, about 75 mL of acetic acid were collected. The reactants were cooled and collected as a yellow resin of oligomeric PLA capped with acetic acid with the following properties: Mn=428; Mw=604; PDI=1.4; and Acid No.=3.5. The oligomer was useful with a latex binder and paint ingredients to form a latex paint.

Although the above illustrative examples demonstrate the merits of this invention, the scope of the invention is not intended to be limited except by the appended claims.

What is claimed is:

1. An ambient dry paint coating composition substantially free of volatile organic coalescing solvent, the paint having a film forming polymeric binder comprising by weight:
   an aqueous emulsion polymeric film forming matrix polymer of copolymerized ethylenically unsaturated monomers; and
   at least 3% of a low molecular weight poly(hydroxy alkanoic acid) oligomer of copolymerized hydroxy alkanoic acid having from 2 to 4 carbon atoms and being an external modifier of the matrix polymer, the oligomer having number average molecular weight between about 300 and 10,000 and a Tg below about 0° C., the oligomer having terminal alkyl aliphatic ester groups where the alkyl chain has from 3 to 20 carbon atoms, where the mixture of the oligomer and the matrix polymer are film forming and provide an air dry coating composition substantially free of organic coalescing solvent.

2. The paint coating composition of claim 1 where the oligomer comprises between 5% and 20% by weight of the film forming polymeric binder mixture.

3. The paint coating composition of claim 2 where the oligomer has a molecular weight between about 300 and 2,000.

4. The paint coating composition of claim 3 where the oligomer has a number average molecular weight between 500 and 1,000.

5. The paint coating composition of claim 1 where the alkyl chain of the terminal alkyl ester group has from 8 to 12 carbon atoms.

6. The coating composition of claim 1 where the poly(hydroxy alkanoic acid) oligomer comprises poly(lactic acid).

7. The paint coating composition of claim 6 comprising from 5% to 20% by weight oligomer based on the total weight of oligomer and matrix polymer.

8. The paint coating composition of claim 6 where the molecular weight of the poly(lactic acid) oligomer is between 300 and 20,000.

9. The paint composition of claim 6 where the molecular weight of the poly(lactic acid) oligomer is between 500 and 1,000.

10. The paint composition of claim 6 where the poly(lactic acid) oligomer comprises from 3 to 15 copolymerized lactic acid monomeric units.

11. The paint composition of claim 6 where the poly(lactic acid) oligomer comprises a copolymer of polymerized lactic acid with lesser amounts of hydroxyalkanoic acid other than lactic acid.

12. The paint composition of claim 11 where the hydroxyalkanoic acid is selected from glycolic acid, hydracrylic acid, and a hydroxybutyric acid.

13. The paint composition of claim 6 where the oligomer is produced by alkyl alcohol degradative transesterification of a high molecular weight poly(lactic acid) polymer, and the alkyl alcohol is a mono alcohol having an alkyl chain from 3 to 20 carbon atoms.

14. The paint composition of claim 13 where the alkyl alcohol alkyl chain has from 8 to 12 carbon atoms.

15. The paint composition of claim 6 where the oligomer is produced by copolymerizing lactic acid with an alkyl mono alcohol.

16. The paint composition of claim 6 where the oligomer is produced by reacting lactide with. alkyl alcohol.

17. The paint composition of claim 1 where the poly(hydroxy alkanoic acid) oligomer comprises poly(glycolic acid).

18. The paint coating composition of claim 17 where the paint comprises from 5% to 20% by weight oligomer based on the total weight of oligomer and matrix polymer.

19. The paint coating composition of claim 17 where the molecular weight of the poly(glycolic acid) oligomer is between 300 and 2,000.

20. The paint composition of claim 17 where the molecular weight of the poly(glycolic acid) oligomer is between 500 and 1,000.

21. The paint composition of claim 17 where the poly(glycolic acid) oligomer comprises form 3 to 15 copolymerized glycolic acid monomeric units.

22. The paint composition of claim 17 where the poly(glycolic acid) oligomer comprises a copolymer of polymerized glycolic acid with lesser amounts of an hydroxyalkanoic acid other than glycolic acid.

23. The paint composition of claim 22 where the hydroxyalkanoic acid is selected from lactic acid, hydracrylic acid, and a hydroxybutyric acid.

24. The paint composition of claim 17 where the oligomer is produced by alkyl alcohol degradative transesterification of a high molecular weight poly(glycolic acid) polymer, where the alkyl alcohol has an alkyl chain form 3 to 20 carbon atoms.

25. The paint composition of claim 24 where the alkyl alcohol alkyl chain has from 8 to 12 carbon atoms.

26. The paint composition of claim 24 where the oligomer is produced by copolymerizing glycolic acid in the presence of an alkyl mono alcohol.

27. The paint composition of claim 1 where the poly(hydroxy alkanoic acid) oligomer comprises 3 to 15 copolymerized monomeric units of hydroacrylic acid to produce a poly(hydroacrylic acid) oligomer.

28. The paint composition of claim 27 where the poly(hydroacrylic acid) oligomer is a copolymer of hydroacrylic acid copolymerized with lesser amounts of a hydroxy alkanoic acid other than hydroacrylic acid.

29. The paint composition of claim 1 where the poly(hydroalkanoic acid) oligomer comprises 3 to 15 copolymerized units of hydroxybutyric acid to produce a poly (hydroxybutyric acid) oligomer.

30. The paint composition of claim 29 where the poly (hydroxybutyric acid) oligomer is a copolymer of hydroxybutyric acid copolymerized with lesser amounts of a hydroxy alkanoic acid other than hydroxybutyric acid.

31. An ambient dry paint coating composition containing an oligomeric film forming modifier for a matrix polyrner, the paint having a film forming polymeric binder comprising by weight:

an aqueous emulsion polymeric film forming matrix polymer of copolymerized ethylenically unsaturated monomers; and at least 3% of a low molecular weight poly(hydroxy alkanoic acid) oligomer of copolymerized hydroxy alkanoic acid having from 2 to 4 carbon atoms and being an external modifier of the matrix polymer, the oligomer having number average molecular weight between about 300 and 10,000 and a Tg below about 0° C., the oligomer having terminal alkyl aliphatic ester groups where the alkyl chain has from 3 to 20 carbon atoms, where the mixture of the oligomer and the matrix polymer are film forming and provide an air dry coating composition.

\* \* \* \* \*